(12) United States Patent
Kondo

(10) Patent No.: US 10,005,465 B2
(45) Date of Patent: Jun. 26, 2018

(54) MOVING BODY CONTROL DEVICE, MOVING BODY CONTROL METHOD, AND CONTROL PROGRAM

(71) Applicant: Hideki Kondo, Nagoya (JP)

(72) Inventor: Hideki Kondo, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 309 days.

(21) Appl. No.: 14/784,661

(22) PCT Filed: Apr. 9, 2014

(86) PCT No.: PCT/IB2014/000590
§ 371 (c)(1),
(2) Date: Oct. 15, 2015

(87) PCT Pub. No.: WO2014/170747
PCT Pub. Date: Oct. 23, 2014

(65) Prior Publication Data
US 2016/0059860 A1   Mar. 3, 2016

(30) Foreign Application Priority Data

Apr. 18, 2013 (JP) ................................ 2013-087242

(51) Int. Cl.
*B60W 30/18* (2012.01)
*G05D 1/08* (2006.01)
(Continued)

(52) U.S. Cl.
CPC ...... *B60W 30/18181* (2013.01); *B60W 40/11* (2013.01); *B62K 11/007* (2016.11); *G05D 1/0891* (2013.01)

(58) Field of Classification Search
CPC ............ B60W 30/18181; B60W 40/11; B62K 11/007; G05D 1/0891
See application file for complete search history.

(56) References Cited

U.S. PATENT DOCUMENTS 7,962,256 B2 * 6/2011 Stevens ................ G05D 1/0891
180/167
8,225,891 B2 * 7/2012 Takenaka ............. B62K 11/007
180/7.1
(Continued)

FOREIGN PATENT DOCUMENTS

JP    2010-500220      1/2010
JP    2010-095121 A    4/2010
(Continued)

*Primary Examiner* — Kimberly S Berona
*Assistant Examiner* — Michael F Whalen
(74) *Attorney, Agent, or Firm* — Finnegan, Henderson, Farabow, Garrett & Dunner LLP

(57) ABSTRACT

A moving body control device includes an attitude angle detection section configured to detect ah attitude angle of an inverted moving body, a command value generation section configured to generate an attitude angular speed command value of the inverted moving body according to the attitude angle detected by the attitude angle detection section, a control section configured to control drive of the inverted moving body according to the attitude angular speed command value generated by the command value generation section, a determination section configured to make a determination whether or not the inverted moving body travels in a constant direction for a prescribed time or longer, and an acceleration-deceleration command section configured to increase or decrease the attitude angular speed command value generated by the command value generation section when the determination section makes a determination that travel is performed in the constant direction for the prescribed time or longer.

10 Claims, 8 Drawing Sheets

(51) Int. Cl.
  *B60W 40/11*  (2012.01)
  *B62K 11/00*  (2006.01)

(56) References Cited

U.S. PATENT DOCUMENTS

| | | | | |
|---|---|---|---|---|
| 9,180,926 | B2* | 11/2015 | Nakamura | B62K 3/007 |
| 2008/0039990 | A1* | 2/2008 | Stevens | G05D 1/0891 |
| | | | | 701/22 |
| 2009/0105908 | A1* | 4/2009 | Casey | A63C 17/08 |
| | | | | 701/41 |
| 2009/0288900 | A1* | 11/2009 | Takenaka | B62K 11/007 |
| | | | | 180/218 |
| 2010/0057319 | A1* | 3/2010 | Inaji | G05D 1/0891 |
| | | | | 701/70 |
| 2010/0168993 | A1* | 7/2010 | Doi | B60L 15/00 |
| | | | | 701/124 |
| 2011/0264350 | A1* | 10/2011 | Doi | B60L 15/20 |
| | | | | 701/90 |
| 2011/0282532 | A1 | 11/2011 | Kosaka et al. | |
| 2012/0046856 | A1* | 2/2012 | Doi | B60L 15/20 |
| | | | | 701/124 |
| 2012/0150408 | A1* | 6/2012 | Takenaka | B62K 1/00 |
| | | | | 701/70 |
| 2014/0091543 | A1* | 4/2014 | Menard | A61H 3/04 |
| | | | | 280/87.021 |
| 2015/0183463 | A1* | 7/2015 | Shirato | A61H 3/04 |
| | | | | 701/41 |
| 2015/0191121 | A1* | 7/2015 | Kida | B62K 11/007 |
| | | | | 340/438 |

FOREIGN PATENT DOCUMENTS

| | | | | |
|---|---|---|---|---|
| JP | WO 2010047070 A1 * | 4/2010 | | B60L 15/20 |
| JP | 2010-149575 A | 7/2010 | | |
| JP | WO 2015033859 A1 * | 3/2015 | | A61H 3/04 |
| JP | WO 2015056686 A1 * | 4/2015 | | A61H 3/04 |
| JP | WO 2015137203 A1 * | 9/2015 | | A61H 3/04 |
| WO | WO 2008/022067 A2 | 2/2008 | | |
| WO | WO 2011/108029 A1 | 9/2011 | | |

* cited by examiner

MOVING BODY CONTROL DEVICE, MOVING BODY CONTROL METHOD, AND CONTROL PROGRAM

CROSS-REFERENCE TO RELATED APPLICATIONS

This application is a national phase application of International Application No. PCT/IB2014/000590, filed Apr. 9, 2014, and claims the priority of Japanese Application No. 2013-087242, filed Apr. 18, 2013, the content of both of which is incorporated herein by reference.

BACKGROUND OF THE INVENTION

1. Field of the Invention

The present invention relates to a moving body control device that controls an inverted moving body that travels while maintaining an inverted state, a moving body control method, and a control program.

2. Description of Related Art

An inverted moving body has been known that performs desired travel such as forward or reverse travel according to an inclination of the moving body while maintaining an inverted state of the moving body (for example, see Published Japanese Translation of PCT application No. 2010-500220 (JP 2010-500220 A)).

Incidentally, the above-described inverted moving body is required to be inclined in an opposite direction to a traveling direction in a case of braking, for example. However, when the inverted moving body moves at a high moving speed, the inverted moving body is largely inclined in the traveling direction. Accordingly, when braking is performed in this state, it is difficult for the inverted moving body to be quickly inclined in the opposite direction to the traveling direction, thus resulting in a possible increase in a braking distance. In a case where control to constantly limit a magnitude of the inclination of the inverted moving body is performed in order to facilitate braking, the speed of the inverted moving body is limited.

SUMMARY OF THE INVENTION

The present invention has been made for solving such a problem and provides a moving body control device, a moving body control method, and a control program that enable braking in a short braking distance without limiting a moving speed of the inverted moving body in a normal state.

One aspect of the present invention provides a moving body control device including: an attitude angle detection section configured to detect an attitude angle of an inverted moving body; a command value generation section configured to generate an attitude angular speed command value of the inverted moving body according to the attitude angle that is detected by the attitude angle detection section; a control section configured to control drive of the inverted moving body according to the attitude angular speed command value that is generated by the command value generation section; a determination section configured to make a determination whether or not the inverted moving body travels in a constant direction for a prescribed time or longer; and an acceleration-deceleration command section configured to increase or decrease the attitude angular speed command value that is generated by the command value generation section when the determination section makes a determination that travel is performed in the constant direction for the prescribed time or longer. In the aspect, the acceleration-deceleration command section may be configured to generate a sinusoidal acceleration-deceleration command value, and the moving body control device may further include an adder section configured to add the sinusoidal acceleration-deceleration command value that is generated by the acceleration-deceleration command section to the attitude angular speed command value that is generated by the command value generation section. In the aspect, the acceleration-deceleration command section may be configured to increase or decrease the attitude angular speed command value that is generated by the command value generation section so that an average moving speed of a center of gravity of the inverted moving body becomes constant when the determination section makes a determination that travel is performed in the constant direction for the prescribed time or longer. In the aspect, the acceleration-deceleration command section may be configured to increase or decrease the attitude angular speed command value that is generated by the command value generation section and increase or decrease a moving speed of a driving wheel of the inverted moving body to change an inclination of the inverted moving body with swinging movement when the determination section makes a determination that travel is performed in the constant direction for the prescribed time or longer. In the aspect, the acceleration-deceleration command section may be configured to increase or decrease a period of the sinusoidal acceleration-deceleration command value according to information of an environment where the inverted moving body moves. In the aspect, the acceleration-deceleration command section may be configured to decrease the period of the sinusoidal acceleration-deceleration command value when a determination that the inverted moving body moves in an indoor environment is made and increase the period of the sinusoidal acceleration-deceleration command value when a determination that the inverted moving body moves in an outdoor environment is made. In the aspect, the moving body control device may further include a storage section configured to store travel information of the inverted moving body, and the acceleration-deceleration command section may be configured to increase or decrease a period of the sinusoidal acceleration-deceleration command value according to travel information of the inverted moving body that is stored in the storage section. In the aspect, the acceleration-deceleration command section may be configured to decrease the period of the sinusoidal acceleration-deceleration command value when a fluctuation in the travel information of the inverted moving body is large and increase the period of the sinusoidal acceleration-deceleration command value when the fluctuation in the travel information of the inverted moving body is small. In the aspect, the travel information of the inverted moving body may include at least one of an attitude angle, an attitude angular speed, an attitude angular acceleration, a moving distance, a moving speed, and a moving acceleration of the inverted moving body. In the aspect, the acceleration-deceleration command section may be configured to increase or decrease the attitude angular speed command value that is generated by the command value generation section when the determination section makes a determination that forward travel, reverse travel, or a turn is performed in a constant direction for the prescribed time or longer. In the aspect, the moving body control device may further include: a step section on which a rider rides and that is configured to incline in a right-left direction; and a drive section configured to incline the step section in the right-left direction. The acceleration-deceleration command section may be configured to increase or decrease the attitude angular speed command value that is generated by the command value generation section and controls the drive section to control the inclination of the step section when the determination section makes a determination that the turn is performed in the constant direction for the prescribed time or longer. In the aspect, the acceleration-deceleration command section may be configured to control the drive section to decrease an inclination angle of the step section to an outside of the turn when the generated sinusoidal acceleration-deceleration command value is a negative value and control the drive section to increase the inclination angle of the step section to an inside of the turn when the generated sinusoidal acceleration-deceleration command value is a positive value. To achieve the object, a moving body control method in accordance with one aspect of the present invention may be a moving body control method including the steps of: detecting an attitude angle of an inverted moving body; generating an attitude angular speed command value of the inverted moving body according to the detected attitude angle; controlling drive of the inverted moving body according to the generated attitude angular speed command value; determining whether or not the inverted moving body travels in a constant direction for a prescribed time or longer; and increasing or decreasing the generated attitude angular speed command value when a determination that travel is performed in the constant direction for the prescribed time or longer is made. To achieve the object, a control program in accordance with one aspect of the present invention may be a control program including: a process of generating an attitude angular speed command value of an inverted moving body according to a detected attitude angle of the inverted moving body; a process of controlling drive of the inverted moving body according to the generated attitude angular speed command value; a process of determining whether or not the inverted moving body travels in a constant direction for a prescribed time or longer; and a process of increasing or decreasing the generated attitude angular speed command value when a determination that travel is performed in the constant direction for the prescribed time or longer is made, the control program making a computer execute the processes.

The aspects of the present invention can provide the moving body control device, the moving body control method, and the control program that enable braking in a short braking distance without limiting the moving speed of the inverted moving body in the normal state.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
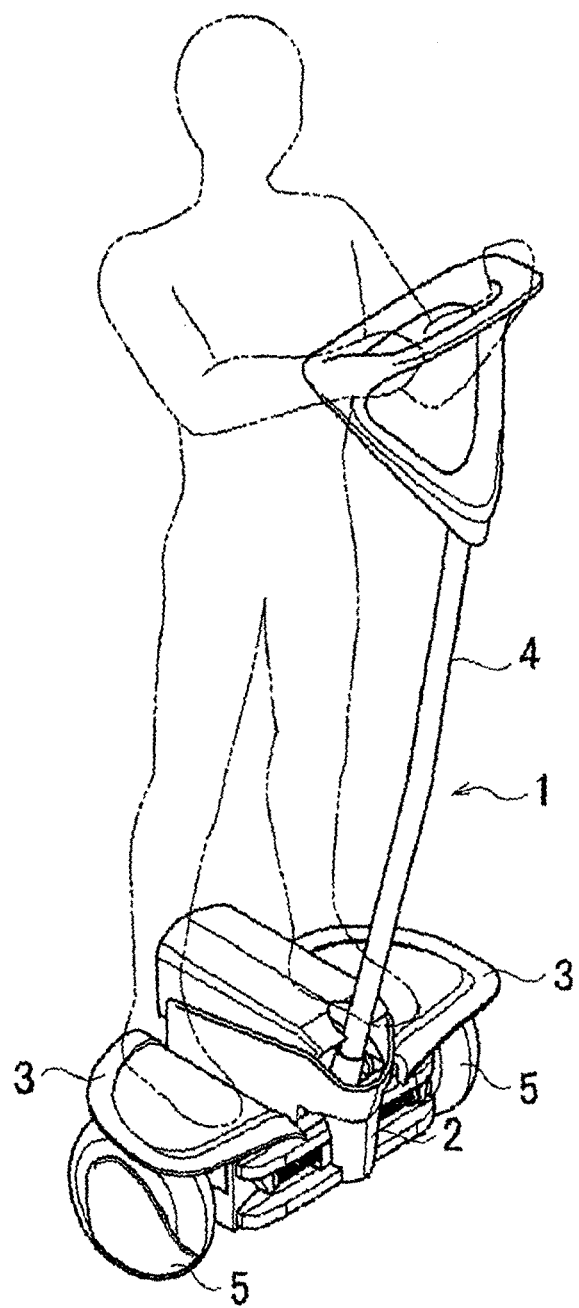
FIG. 1 is a perspective view showing an inverted moving body in accordance with a first embodiment of the present invention.

[First Embodiment] An embodiment of the present invention will hereinafter be described with reference to drawings. A moving body control device in accordance with the first embodiment of the present invention controls travel of an inverted moving body 1 that travels while maintaining an inverted state shown in FIG. 1, for example.

The inverted moving body 1 includes a vehicle main body 2, a pair of right and left step sections 3 that are mounted on the vehicle main body 2 and on which a rider rides, an operating handle 4 that is inclinably mounted on the vehicle main body 2 and the rider holds, a pair of right and left driving wheels 5 that are rotatably mounted on the vehicle main body 2.

The inverted moving body 1 is configured as a coaxial two-wheel vehicle in which the driving wheels 5 are coaxially disposed and that travels while maintaining the inverted state, for example. The inverted moving body 1 is configured to perform forward or reverse travel by inclining the step sections 3 of the vehicle main body 2 forward or rearward by moving a center of gravity of the rider forward or rearward and to perform a right or left turn by inclining the step sections 3 of the vehicle main body 2 to the right or left by moving the center of gravity of the rider to the right or left. Such a coaxial two-wheel vehicle as described above is employed as the inverted moving body 1; however, any moving body that travels while maintaining the inverted state can be employed.

Figure 2:
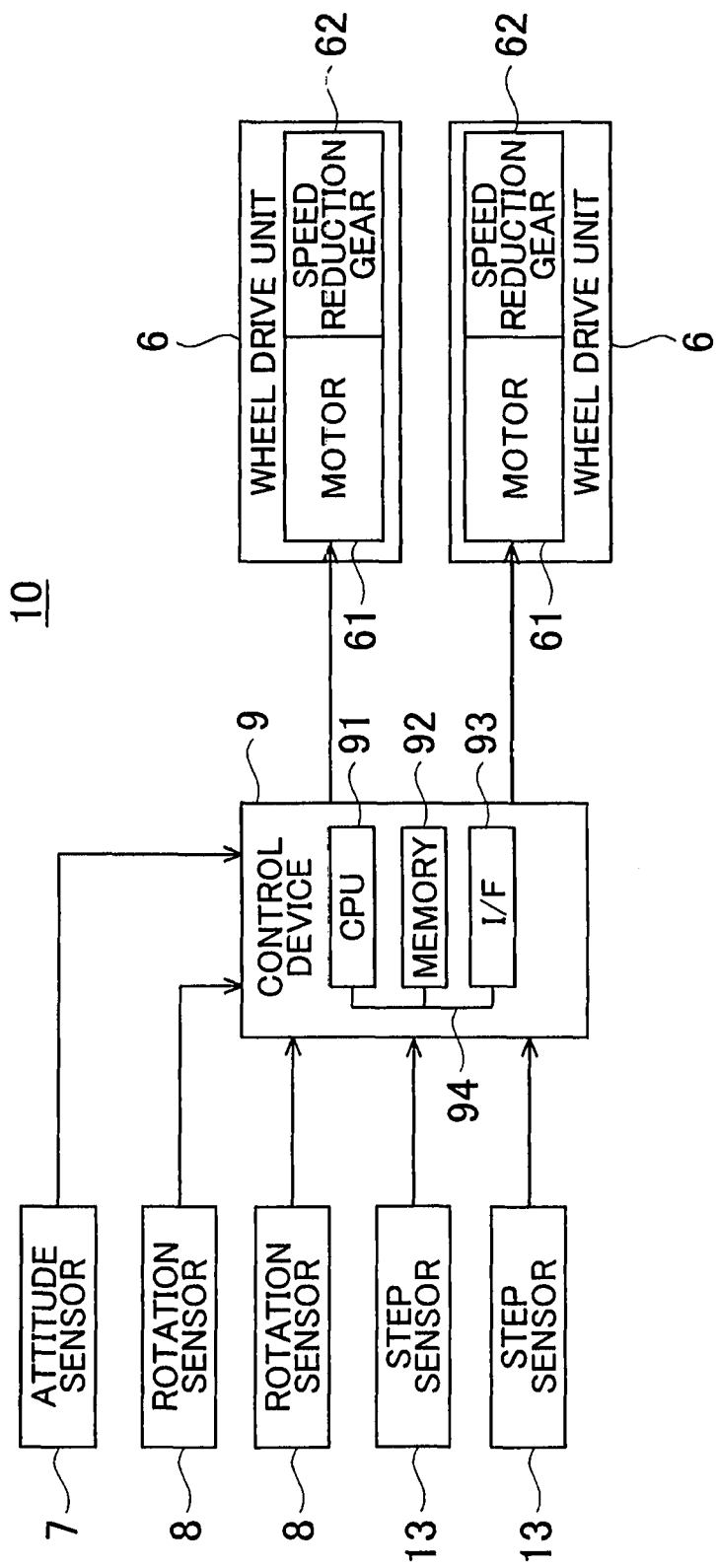
FIG. 2 is a block diagram showing a schematic system configuration of a moving body control device in accordance with the first embodiment of the present invention.

FIG. 2 is a block diagram showing a schematic system configuration of the moving body control device in accordance with the first embodiment of the present invention. A moving body control device 10 in accordance with the first embodiment includes a pair of wheel drive units 6 that drive the respective driving wheels 5, an attitude sensor 7 that detects an attitude of the vehicle main body 2, a pair of rotation sensors 8 that detect rotation information of the respective driving wheels 5, a control device 9 that controls each of the wheel drive units 6, and a pair of step sensors 13 that detect stepping on or off each of the step sections 3 of the rider.

The wheel drive units 6 are contained in the vehicle main body 2 and drive the pair of respective driving wheels 5. The wheel drive units 6 can independently rotate and drive the pair of respective driving wheels 5. Each of the wheel drive units 6 can be configured with a motor 61 and a speed reduction gear 62 that is connected to a rotational shaft of the motor 61 so as to be capable of power transmission, for example.

The attitude sensor 7 is one specific example of an attitude angle detection section and is provided in the vehicle main body 2 to detect attitude information such as attitude angles (inclination angles), attitude angular speeds (inclination angular speeds), and attitude angular accelerations (inclination angular accelerations) of the vehicle main body 2, the operating handle 4, and the like. The attitude sensor 7 detects the attitude information during travel of the inverted moving body 1 and is configured with a gyro sensor, an acceleration sensor, the like, for example. When the rider inclines the operating handle 4 forward or rearward, the step sections 3 incline in the same direction. The attitude sensor 7 detects the attitude information corresponding to such an inclination. The attitude sensor 7 outputs the detected attitude information to the control device 9.

The rotation sensors 8 are provided in the respective driving wheels 5 or the like and can detect rotation information such as rotational angles, rotational angular speeds, and rotational angular accelerations of the respective driving wheels 5. Each of the rotation sensors 8 is configured with a rotary encoder, a resolver, or the like, for example. The rotation sensor 8 outputs the detected rotation information to the control device 9.

The control device 9 generates and outputs a control signal for driving and controlling each of the wheel drive units 6 on the basis of a detected value that is output from each of the sensors installed in the moving body 1. The control device 9 executes a prescribed computation process on the basis of the attitude information that is output from the attitude sensor 7, the rotation information of the driving wheels 5 that is output from the respective rotation sensors 8, and the like and outputs a necessary control signal to each of the wheel drive units 6. The control device 9 controls each of the wheel drive units 6 to execute inversion control for maintaining the inverted state of the inverted moving body 1, for example.

The control device 9 has a hardware configuration with a microcomputer as a main component that is formed with a CPU (Central Processing Unit) 91 that performs a control process, the computation process, and the like, a memory 92 that is formed with a ROM (Read Only Memory) and a RAM (Random Access Memory) that store computation programs and the like to be executed by the CPU 91, an interface section (I/F) 93 that performs input and output of signals to and from the outside, for example. The CPU 91, the memory 92, and the interface section 93 are connected with each other via a data bus 94 or the like.

Incidentally, when the inverted moving body performs braking, for example, it is required to incline the attitude of the inverted moving body in an opposite direction to a traveling direction. However, when the inverted moving body moves at a high moving speed, the inverted moving body is largely inclined in the traveling direction. Accordingly, when braking is performed in this state, it is difficult for the inverted moving body to be quickly inclined in the opposite direction to the traveling direction, thus resulting in a possible increase in a braking distance. In a case where control to constantly limit a magnitude of the inclination of the inverted moving body is performed in order to facilitate braking, for example, the speed of the inverted moving body is limited.

Figure 3:
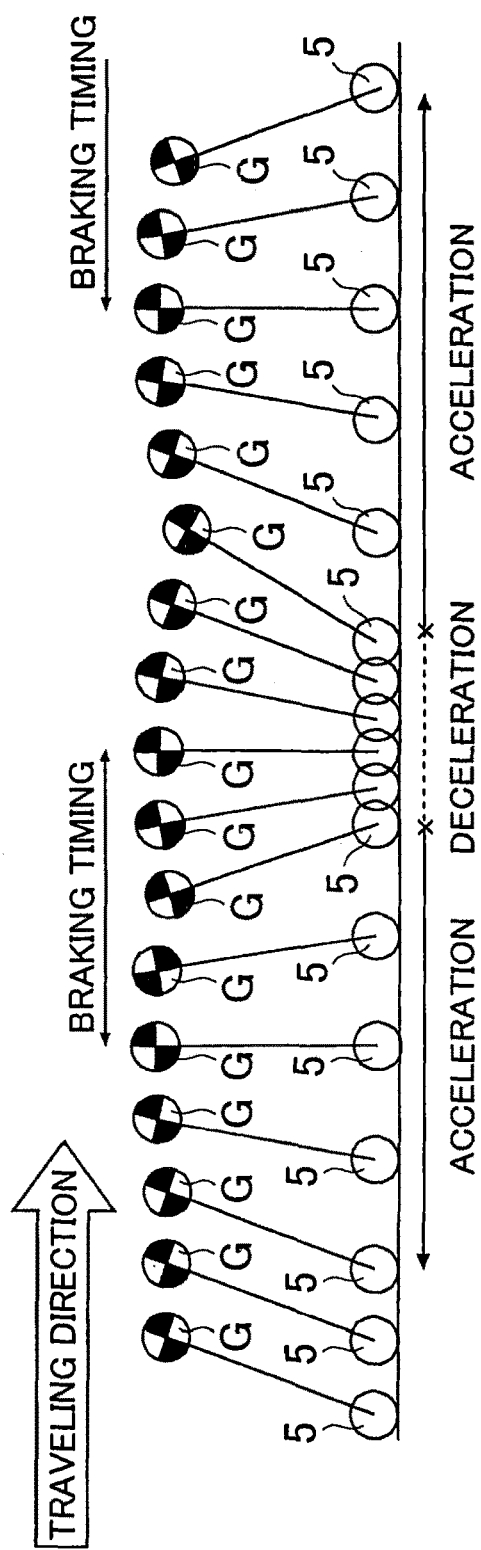
FIG. 3 shows changes in an inclination of the inverted moving body with swinging movement.

Accordingly, in the first embodiment, when the inverted moving body 1 travels in a constant direction for a prescribed time or longer, an attitude angular speed command value is increased or decreased to increase or decrease the moving speed of the driving wheels 5, thereby changing the inclination of the inverted moving body 1 with swinging movement (FIG. 3). Consequently, the rider can easily perform braking at a timing when the inverted moving body 1 periodically inclines rearward, and the braking distance can thus be reduced. In addition, as described above, because the inclination of the inverted moving body 1 is only changed intentionally, it is not required to limit the moving speed of the inverted moving body 1 in a normal state.

Figure 4:
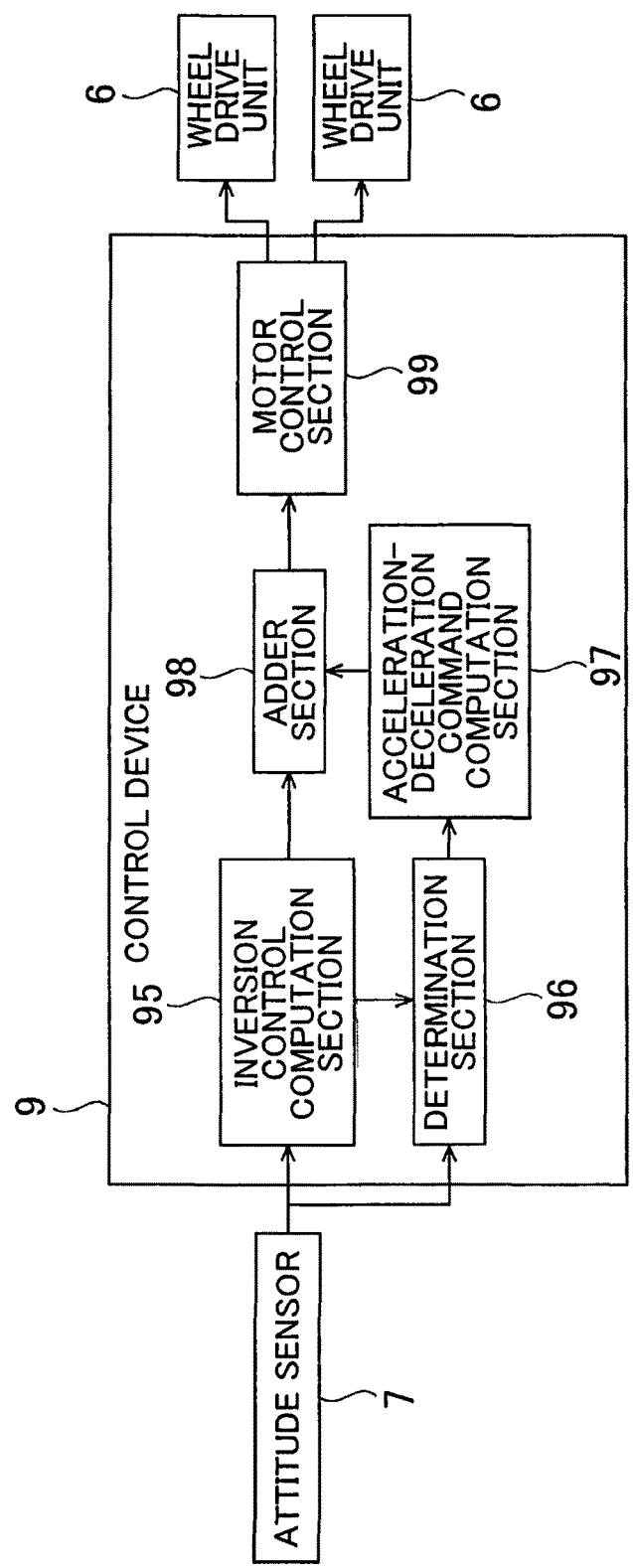
FIG. 4 is a block diagram showing a schematic system configuration of the control device in accordance with the first embodiment of the present invention.

Here, a detailed description will be made about a configuration of the control device 9 in accordance with the first embodiment for achieving the above-described control. FIG. 4 is a block diagram showing a schematic system configuration of the control device in accordance with the first embodiment. The control device 9 in accordance with the first embodiment has an inversion control computation section 95, a determination section 96, an acceleration-deceleration command computation section 97, an adder section 98, and a motor control section 99.

The inversion control computation section 95 is one specific example of a command value generation section and generates a command value of the attitude angular speed (hereinafter referred to as "attitude angular speed command value") of the inverted moving body 1 such that the inverted moving body 1 maintains the inverted state on the basis of the attitude angle of the vehicle main body 2 that is output from the attitude sensor 7. The inversion control computation section 95 outputs the generated attitude angular speed command value to the determination section 96 and the adder section 98.

The determination section 96 is one specific example of a determination section and determines whether or not the inverted moving body 1 travels in the constant direction for the prescribed time or longer.

The determination section 96 makes a determination whether or not the inverted moving body 1 travels in the constant direction for the prescribed period or longer (for example, a short time such as about three seconds) on the basis of the attitude angle of the vehicle main body 2 that is output from the attitude sensor 7 and the attitude angular speed command value that is output from the inversion control computation section 95, for example. The determination section 96 may calculate the moving speed of the inverted moving body 1 on the basis of the rotation information that is output from each of the rotation sensors 8 and make a determination whether or not the inverted moving body 1 travels in the constant direction for the prescribed time or longer on the basis of the calculated moving speed.

An optimal value of the prescribed time is set on the basis of a peripheral environment where the inverted moving body 1 moves. For example, in a case where the inverted moving body 1 travels in an environment such as an indoor environment where relatively many obstacles are present, the prescribed time is set shorter than a normal time. On the other hand, in a case where the inverted moving body 1 travels in an environment such as an outdoor environment where a relatively few obstacles are present, the prescribed time is set longer than the normal time. For example, the prescribed time is set shorter than the normal time in a case where a fluctuation in the travel information is large on the basis of the traveling information (the moving speed, a moving acceleration, and the like) of the inverted moving body 1 that is stored in the control device 9. On the other hand, the prescribed time is set longer than the normal time in a case where the fluctuation in the travel information is small on the basis of the traveling information of the inverted moving body 1 that is stored in the control device 9. Further, the constant direction includes forward travel or reverse travel in a constant direction and a turn in a constant direction, for example.

When the determination section 96 determines that the inverted moving body 1 travels in the constant direction for the prescribed period or longer on the basis of the attitude angle of the vehicle main body 2 that is output from the attitude sensor 7 and the attitude angular speed command value that is output from the inversion control computation section 95, for example, the determination section 96 outputs an ON signal that indicates the determination to the acceleration-deceleration command computation section 97.

The acceleration-deceleration command computation section 97 is one specific example of an acceleration-deceleration command section and increases or decreases the attitude angular speed command value that is generated by the inversion control computation section 95 when a determination that the inverted moving body 1 travels in the constant direction for the prescribed time or longer is made by the determination section 96. For example, the acceleration-deceleration command computation section 97 generates a sinusoidal acceleration-deceleration command value and outputs the generated acceleration-deceleration command value to the adder section 98 when the ON signal is received from the determination section 96. The adder section 98 adds the sinusoidal acceleration-deceleration command value to the attitude angular speed command value that is output from the inversion control computation section 95 when the acceleration-deceleration command value is output from the acceleration-deceleration command computation section 97. Accordingly, when the inverted moving body 1 travels in the constant direction for the prescribed time or longer, the attitude angular speed command value that is generated by the inversion control computation section 95 is increased or decreased.

The acceleration-deceleration command computation section 97 generates the sinusoidal acceleration-deceleration command value by use of an equation (1) below, for example. In the equation (1) below, a term A is an amplitude [rad/s] of a preset acceleration-deceleration command value (attitude angular speed command value). A term T is a period [s] of the preset acceleration-deceleration command value (attitude angular speed command value).

$$\text{Acceleration-deceleration command value} = A \cdot \sin(2\pi/T)t \qquad \text{Equation (1)}$$

The acceleration-deceleration command computation section 97 outputs the acceleration-deceleration command value that is calculated by use of the equation (1) to the adder section 98 when the ON signal is received from the determination section 96.

The adder section 98 outputs the attitude angular speed command value that is output from the inversion control computation section 95 to the motor control section 99 with no addition when the acceleration-deceleration command value is not output from the acceleration-deceleration command computation section 97. In this case, the inverted moving body 1 performs normal inversion control according to the attitude angular speed command value.

On the other hand, when the sinusoidal acceleration-deceleration command value is output from the acceleration-deceleration command computation section 97, the adder section 98 adds the output acceleration-deceleration command value to the attitude angular speed command value that is output from the inversion control computation section 95 by an equation (2) below and calculates a corrected attitude angular speed command value.

$$\text{Corrected attitude angular speed command value} = \text{acceleration-deceleration command value} + \text{attitude angular speed command value} \qquad \text{Equation (2)}$$

Accordingly, the adder section 98 calculates the corrected attitude angular speed command value and outputs that to the motor control section 99. In this case, the inverted moving body 1 performs the inversion control while changing the inclination with swinging movement according to the corrected attitude angular speed command value (FIG. 3).

The acceleration-deceleration command computation section 97 outputs such a sinusoidal acceleration-deceleration command value as described above to an adder section 98 to increase or decrease the attitude angular speed command value that is output from the inversion control computation section 95 so that an average moving speed of an attitude of the center of gravity G of the inverted moving body 1 becomes constant. In this case, as shown in FIG. 3, although the driving wheels 5 repeat increase and decrease and the inclination of the inverted moving body 1 changes with swinging movement, the attitude of the center of gravity G maintains a general constant speed. Consequently, the rider is less likely to experience discomfort even when the inclination of the inverted moving body 1 changes with swinging movement, and traveling comfort can thus properly be maintained.

The motor control section 99 generates a control signal for controlling each of the wheel drive units 6 on the basis of the attitude angular speed command value that is output from the adder section 98 and outputs that to each of the wheel drive units 6. The motors 61 of the respective wheel drive units 6 rotate and drive the respective driving wheels 5 according to the control signal that is output from the motor control section 99.

Figure 5:
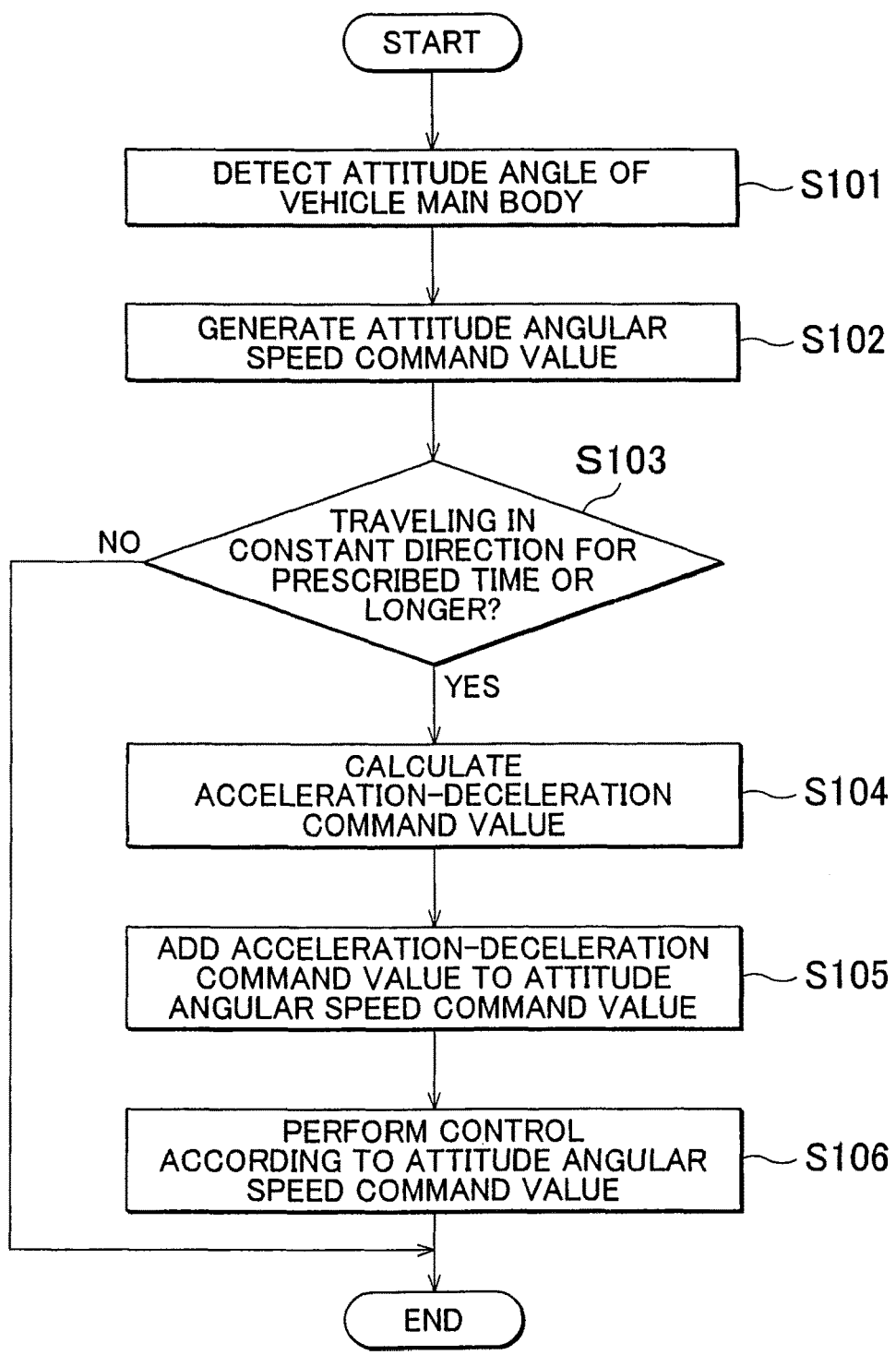
FIG. 5 is a flowchart that shows a control process flow of a control method by the moving body control device in accordance with the first embodiment.

FIG. 5 is a flowchart that shows a control process flow of a control method by the moving body control device in accordance with the first embodiment. The control process shown in FIG. 5 is repeatedly executed in each prescribed time.

The attitude sensor 7 detects the attitude angle of the vehicle main body 2 (step S101) and outputs that to the inversion control computation section 95 and the determination section 96 of the control device 9.

The inversion control computation section 95 generates the attitude angular speed command value on the basis of the attitude angle of the vehicle main body 2 that is output from the attitude sensor 7 (step S102) and outputs that to the determination section 96 and the adder section 98.

The determination section 96 makes a determination whether or not the inverted moving body 1 travels in the constant direction for the prescribed period or longer on the basis of the attitude angle of the vehicle main body 2 that is output from the attitude sensor 7 and the attitude angular speed command value that is output from the inversion control computation section 95 (step S103).

When the determination section 96 determines, that the inverted moving body 1 travels in the constant direction for the prescribed time or longer (YES in step S103), the determination section 96 outputs the ON signal that indicates the determination to the acceleration-deceleration command computation section 97. The acceleration-deceleration command computation section 97 calculates the sinusoidal acceleration-deceleration command value by use of the equation (1) when the ON signal is received from the determination section 96 (step S104) and outputs that to the adder section 98. The adder section 98 adds the acceleration-deceleration command value that is output from the acceleration-deceleration command computation section 97 and the attitude angular speed command value that is output from the inversion control computation section 95 to calculate the corrected attitude angular speed command value (step S105) and outputs that to the motor control section 99.

On the other hand, when the determination section 96 determines that the inverted moving body 1 does not travel in the constant direction for the prescribed time or longer (NO in step S103), the control process is finished.

The motor control section 99 controls each of the wheel drive units 6 on the basis of the attitude angular speed command value that is output from the adder section 98 (step S106).

As described above, the attitude angular speed command value is increased or decreased in the moving body control device 10 in accordance with the first embodiment when the inverted moving body 1 travels in the constant direction for the prescribed time or longer. Consequently, braking can easily be performed at the timing when the inverted moving body 1 periodically inclines rearward, and the braking distance can thus be reduced. In addition, as described above, because the inclination of the inverted moving body 1 is only changed with swinging movement intentionally, it is not required to limit the moving speed of the inverted moving body 1 in the normal state. That is to say, braking in a short braking distance can be performed without limiting the moving speed of the inverted moving body 1 in the normal state.

[Second Embodiment] A second embodiment of the present invention is characterized in that a period of the sinusoidal acceleration-deceleration command value is increased or decreased according to the surrounding environment where the inverted moving body 1 moves. As shown in FIG. 3, the inclination is changed with swinging movement when the inverted moving body 1 travels in the constant direction for a specified time or longer. In this state, a timing when the inverted moving body 1 inclines rearward and can easily be braked (hereinafter referred to as "braking timing") is periodically produced.

In the second embodiment, the acceleration-deceleration command computation section 97 increases or decreases the period of the sinusoidal acceleration-deceleration command value according to the surrounding environment where the inverted moving body 1 moves and thereby adjusts a length of the braking timing to an optimal length for the surrounding environment.

For example, it is supposed that the rider performs braking of the inverted moving body 1 in a relatively short period (at a high frequency) in the surrounding environment such as an indoor environment where many obstacles are present. Accordingly, the period of the sinusoidal acceleration-deceleration command value may be set short in response to the braking in the short period.

The acceleration-deceleration command computation section 97 decreases the period T in the equation (1) when a determination that the inverted moving body 1 travels in an indoor environment is made on the basis of present location information of the inverted moving body 1, for example. Accordingly, because the braking timing is produced in a relatively short period, the rider can quickly perform braking at the braking timing in the short period.

On the other hand, it is supposed that the rider performs braking of the inverted moving body 1 in a relatively long period (at a low frequency) in the surrounding environment such as an outdoor environment where a few obstacles are present (an environment where a long straight travel is performed, or the like). Accordingly, the period of the sinusoidal acceleration-deceleration command value may be set long in response to the braking in the long period.

The acceleration-deceleration command computation section 97 increases the period T in the equation (1) when a determination that the inverted moving body 1 travels in an outdoor environment is made on the basis of the present location information of the inverted moving body 1, for example. Consequently, the braking timing is produced in a relatively long period. The rider can certainly perform braking at the braking timing in the long period.

Figure 6:
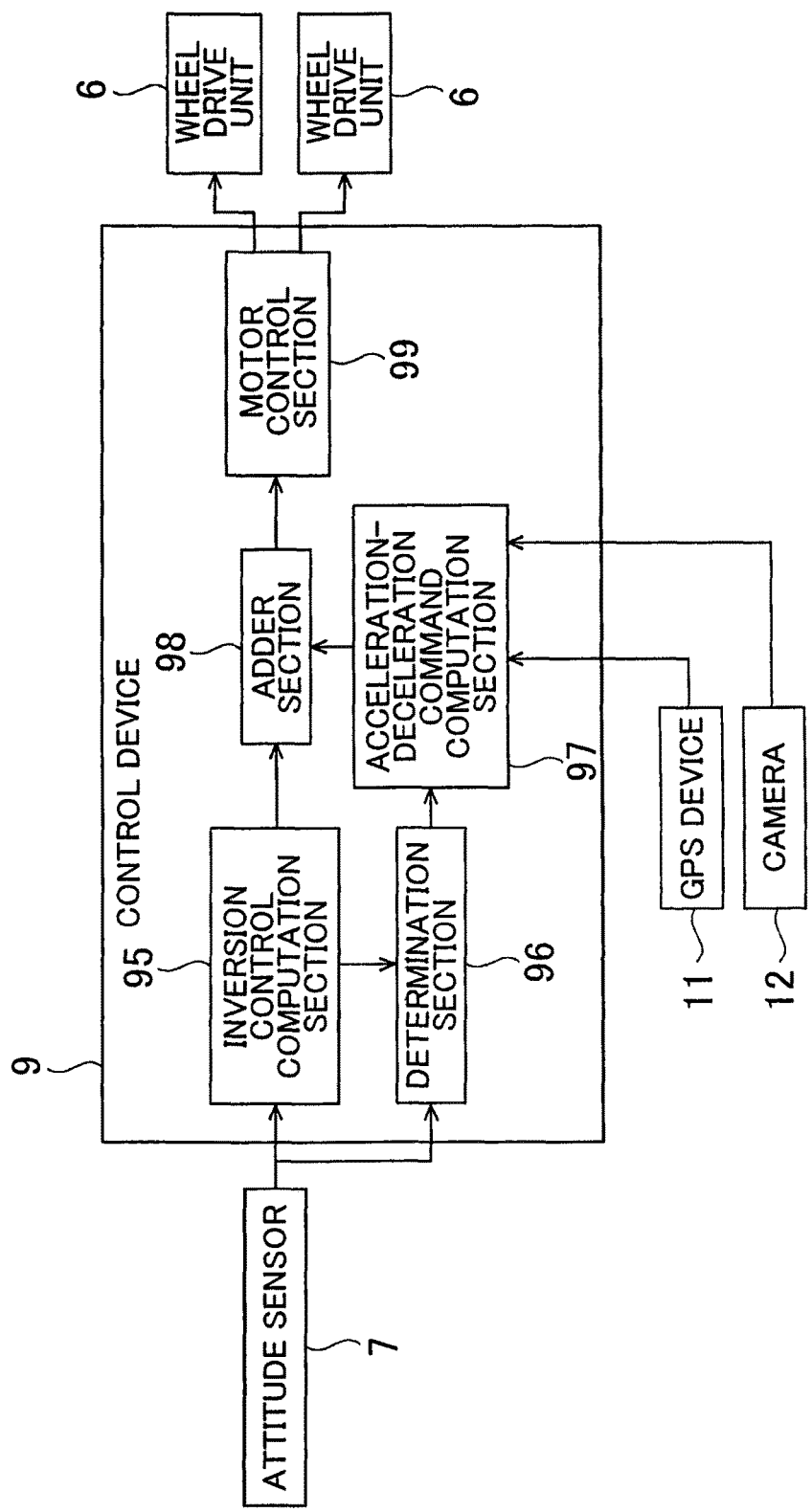
FIG. 6 is a block diagram showing a schematic system configuration of a control device in accordance with a second embodiment of the present invention.

The acceleration-deceleration command computation section 97 calculates a moving distance and a moving direction of the inverted moving body 1 on the basis of the rotation information that is output from each of the rotation sensors 8, for example, and calculates the present location information of the inverted moving body 1 on the basis of the calculated moving distance and moving direction and preset map information. Alternatively, the acceleration-deceleration command computation section 97 may calculate the present location information of the inverted moving body 1 on the basis of location information that is output from a GPS (Global Positioning System) device 11 installed in the inverted moving body 1 (FIG. 6) and can calculate the present location information of the inverted moving body 1 by an arbitrary method.

In addition, the acceleration-deceleration command computation section 97 may detect obstacles around the inverted moving body on the basis of image information around the inverted moving body that is photographed by a camera 12 and thereby calculate a density of obstacles in the surrounding environment. The acceleration-deceleration command computation section 97 increases the period T in the equation (1) when a determination that the calculated density of obstacles is a prescribed threshold or higher is made. On the other hand, the acceleration-deceleration command computation section 97 decreases the period T in the equation (1) when a determination that the calculated density of obstacles is a prescribed threshold or lower is made.

In the second embodiment, the other configurations are generally the same as the first embodiment. Thus, the same reference numerals will be given to the same sections, and a detailed description will not be repeated.

As described above, in the second embodiment, the period of the sinusoidal acceleration-deceleration command value is increased or decreased according to the surrounding environment where the inverted moving body 1 moves. Accordingly, the period of the sinusoidal acceleration-deceleration command value is increased or decreased according to the surrounding environment of the inverted moving body 1, and the braking timing at which the inverted moving body 1 inclines rearward and can easily be braked can thereby be adjusted to the optimal length for the surrounding environment. Consequently, the braking in a shorter braking distance can be performed without limiting the moving speed of the inverted moving body 1 in the normal state.

[Third Embodiment] A third embodiment of the present invention is characterized in that the period of the sinusoidal acceleration-deceleration command value that is calculated by the acceleration-deceleration command computation section 97 is increased or decreased according to the travel information of the inverted moving body 1.

For example, in a case where the fluctuation in past travel information (such as the attitude angle, the attitude angular speed, the attitude angular acceleration, a rotation angle, a rotation angular speed, a rotation angular acceleration, the moving speed, the moving acceleration, and the moving distance) of the inverted moving body 1 is large, it is supposed that the rider performs braking in a relatively short period. Accordingly, the period of the sinusoidal acceleration-deceleration command value may be set short in response to the braking in the short period. On the other hand, in a case where the fluctuation in the travel information of the inverted moving body 1 is small, it is supposed that the rider performs braking in a relatively long period.

Accordingly, the period of the sinusoidal acceleration-deceleration command value may be set long in response to the braking in the long period.

The acceleration-deceleration command computation section 97 decreases the period T in the equation (1) when a determination that the fluctuation in the moving speed is large (a fluctuation amount is a first prescribed threshold or larger) is made on the basis of past moving speed information of the inverted moving body 1, for example. Accordingly, because the braking timing is produced in a relatively short period, the rider can quickly perform braking at the braking timing in the short period.

The acceleration-deceleration command computation section 97 decreases the period T in the equation (1) when a determination that the fluctuation in the moving speed is small (the fluctuation amount is a second prescribed threshold or smaller) is made on the basis of the past moving speed information of the inverted moving body 1, for example. Consequently, the braking timing is produced in a relatively long period. The rider can certainly perform braking at the braking timing in the long period.

Figure 7:
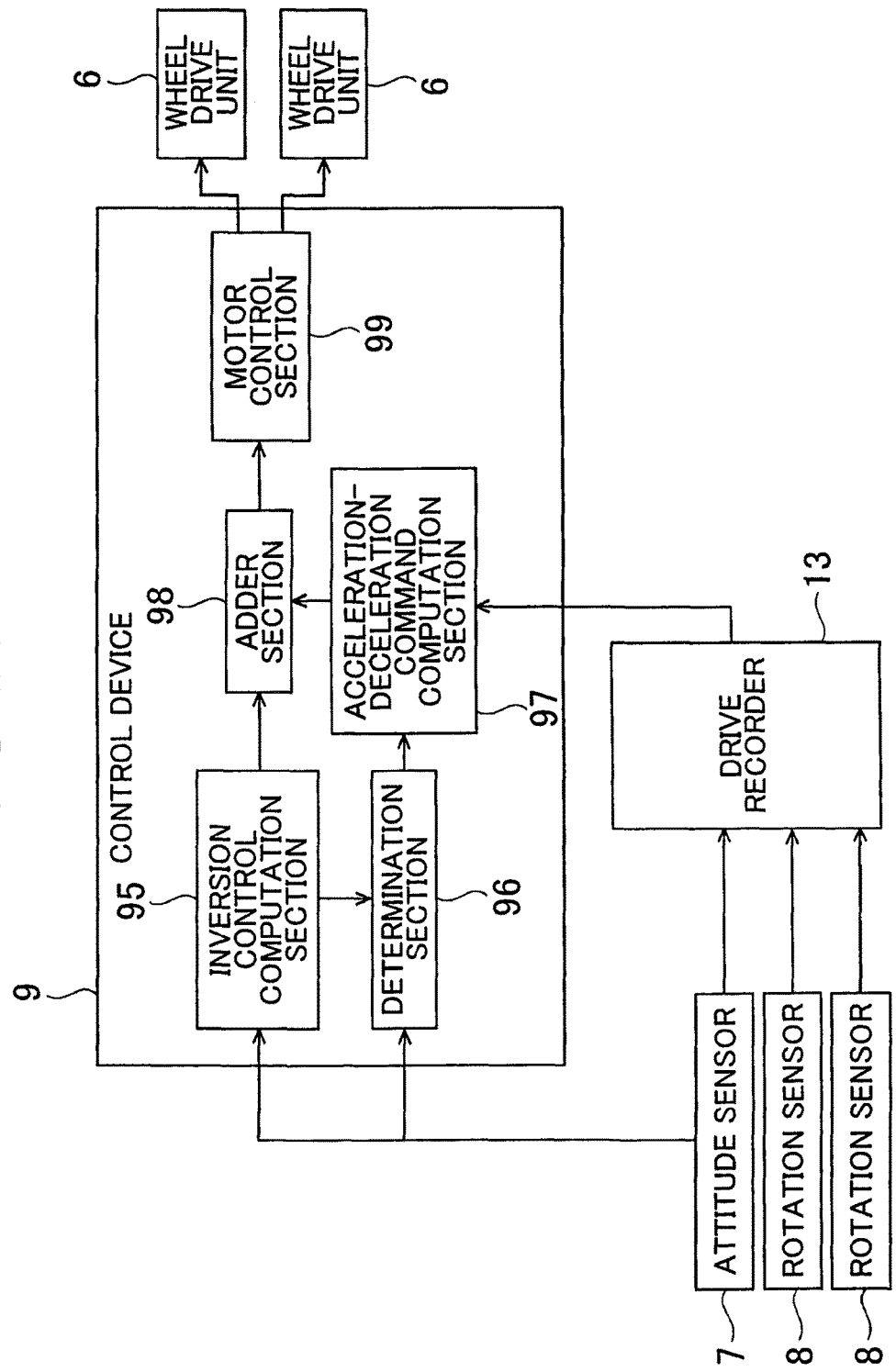
FIG. 7 is a block diagram showing a schematic system configuration of a control device in accordance with a third embodiment of the present invention.

Incidentally, for example, a drive recorder (one specific example of a storage section) 13 or the like in which the travel information of the inverted moving body 1 during travel is accumulated is installed in the inverted moving body 1 (FIG. 7). The acceleration-deceleration command computation section 97 can make a determination about the fluctuation in the travel information by using the past travel information of the inverted moving body 1 that is accumulated in the drive recorder 13.

In the third embodiment, the other configurations are generally the same as the first embodiment. Thus, the same reference numerals will be given to the same sections, and a detailed description will not be repeated.

As described above, in the third embodiment, the period of the sinusoidal acceleration-deceleration command value is increased or decreased according to the travel information of the inverted moving body 1. Accordingly, the period of the sinusoidal acceleration-deceleration command value is increased or decreased according to the travel information of the inverted moving body 1, and the braking timing at which the inverted moving body 1 inclines rearward and can easily be braked can thereby be adjusted to the length that corresponds to the travel information. Consequently, the braking in a shorter braking distance can be performed without limiting the moving speed of the inverted moving body in the normal state.

[Fourth Embodiment] A fourth embodiment of the present invention is characterized in that the attitude angular speed command value is increased or decreased to change the inclination with swinging movement and an inclination of each of the step sections 3 of the vehicle main body 2 is controlled when the inverted moving body 1 is turning in a constant direction for a prescribed time or longer.

Figure 8:
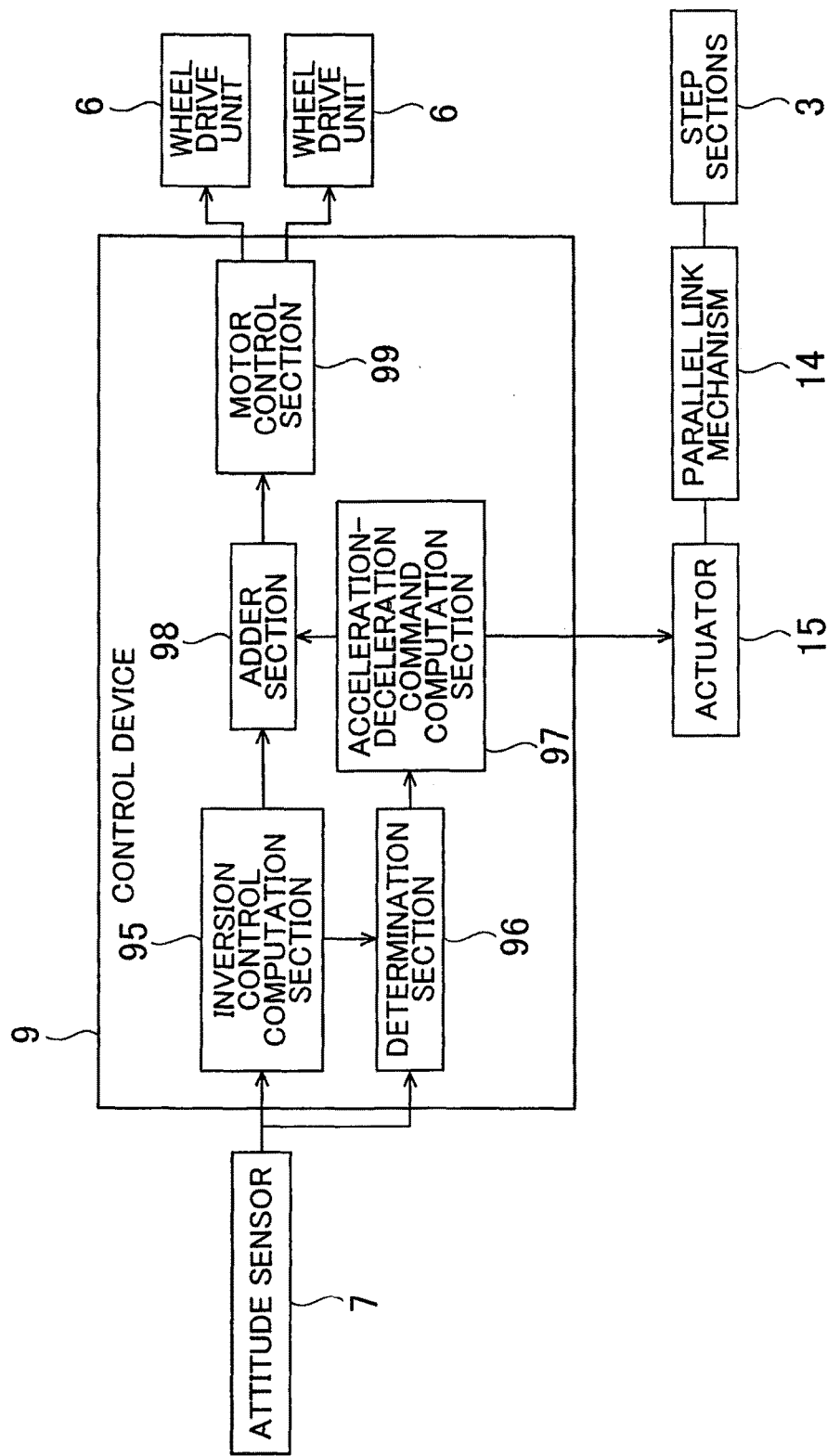
FIG. 8 is a block diagram showing a schematic system configuration of a control device in accordance with a fourth embodiment of the present invention.

Each of the step sections 3 is supported by a parallel link mechanism 14 of the vehicle main body 2, for example, so as to be capable of changing the attitude in the roll direction (FIG. 8). The parallel link mechanism 14 has a vehicle body upper member and a vehicle body lower member that are disposed vertically in parallel with each other and a pair of side surface members that are disposed on right and left in parallel with each other and are rotatably coupled with the vehicle body upper member and the vehicle body lower member. A pair of coil springs that generate spring force are interposed between the vehicle body upper member and the vehicle body lower member so as to maintain right angles between the vehicle body upper member and the vehicle body lower member and the pair of the side surface members. The parallel link mechanism allows parallel inclinations of the step sections 3 in the right-left direction in response to movement of the center of gravity when the rider moves the center of gravity in the right-left direction. The above-described configuration of the parallel link mechanism 14 is one example. The present invention is not limited to this, but any configuration can be applied as long as the step sections 3 can be inclined in parallel.

An actuator (one specific example of a drive section) 15 that inclines the parallel link mechanism 14 in parallel is provided in the parallel link mechanism 14, for example. The actuator 15 inclines the parallel link mechanism 14 in parallel according to a control signal that is output from the acceleration-deceleration command computation section 97 of the control device 9 and thereby inclines the step sections 3.

Here, when the acceleration-deceleration command computation section 97 increases or decreases the attitude angular speed command value during the turn of the inverted moving body 1, centrifugal force on the rider fluctuates in response to the acceleration or deceleration of the inverted moving body 1. Accordingly, the inclinations of the step sections 3 of the vehicle main body 2 may be controlled in a direction for cancelling the fluctuation in the centrifugal force on the rider. Consequently, even when the attitude angular command value is increased or decreased during the turn of the inverted moving body 1, an influence of the fluctuation in the centrifugal force can be reduced, and stability of the inverted moving body 1 can be improved.

For example, when the acceleration-deceleration command value from the acceleration-deceleration command computation section 97 becomes a negative value, the attitude angular speed command value is decreased to decrease the moving speed of the inverted moving body 1. The centrifugal force on the rider is then decreased. Accordingly, control for decreasing inclination angles (inclinations to the inside of the turn) of the step sections 3 of the vehicle main body 2 may be performed so as to cancel the decrease in the centrifugal force. In this case, if a determination that the calculated acceleration-deceleration command value is a negative value is made, the acceleration-deceleration command computation section 97 controls the actuator to perform control for decreasing the inclination angles of the step sections 3 of the vehicle main body 2 to the outside of the turn.

For example, when the acceleration-deceleration command value from the acceleration-deceleration command computation section 97 becomes a positive value, the attitude angular speed command value is increased to increase the moving speed of the inverted moving body 1. The centrifugal force on the rider is then increased. Accordingly, control for increasing the inclination angles (the inclinations to the inside of the turn) of the step sections 3 of the vehicle main body 2 may be performed so as to cancel the increase in the centrifugal force. In this case, if a determination that the calculated acceleration-deceleration command value is a positive value is made, the acceleration-deceleration command computation section 97 controls the actuator to perform control for increasing the inclination angles of the step sections 3 of the vehicle main body 2 to the inside of the turn.

In the fourth embodiment, the other configurations are generally the same as the first embodiment. Thus, the same reference numerals will be given to the same sections, and a detailed description will not be repeated.

As described above, in the fourth embodiment, the attitude angular speed command value is increased or decreased to change the inclination with swinging movement and the inclination of each of the step sections 3 of the vehicle main body 2 is controlled when the inverted moving body 1 is turning in the constant direction for the prescribed time or longer. Accordingly, the influence of the fluctuation in the centrifugal force in a case where the attitude angular command value is increased or decreased during the turn of the inverted moving body 1 can be reduced, and the stability of the inverted moving body 1 can be improved.

It should be noted that the present invention is not limited to the above embodiments but can be appropriately modified without departing from the gist of the present invention.

In the present invention, for example, the process shown in FIG. 5 can be realized by making the CPU 91 execute a computer program.

The program can be stored and supplied to a computer by using various types of non-transitory computer readable media. The non-transitory computer readable media include various types of tangible storage media. Examples of the non-transitory computer readable medium include magnetic storage media (such as a flexible disc, a magnetic tape, and a hard disc drive), magneto-optical storage media (such as a magneto-optical disc), a CD-ROM (Read Only Memory), a CD-R, a CD-R/W, and semiconductor memories (such as a Mask ROM, a PROM (Programmable ROM), an EPROM (Erasable PROM), a flash ROM, and a RAM (Random Access Memory)).

The program may be supplied to the computer by using various types of transitory computer readable media. Examples of the transitory computer readable medium include an electric signal, an optical signal, and an electromagnetic wave. The transitory computer readable medium can supply the program to the computer via wired communication paths such as an electric wire and an optical fiber or wireless communication paths.

The invention claimed is:

1. A moving body control device comprising:
an attitude sensor configured to detect an attitude angle of an inverted moving body; and
a computer programmed to implement
a command value generation section configured to generate a command value of the inverted moving body according to the attitude angle that is detected by the attitude angle detection section,
a control section configured to control drive of the inverted moving body according to the command value that is generated by the command value generation section,
a determination section configured to make a determination whether or not the inverted moving body travels in a constant direction for a prescribed time or longer,
an acceleration-deceleration command section configured to adjust the command value that is generated by the command value generation section when the determination section makes a determination that travel is performed in the constant direction for the prescribed time or longer, and
an adder section, wherein
the acceleration-deceleration command section is configured to generate a sinusoidal acceleration-deceleration command value,
the adder section is configured to add the sinusoidal acceleration-deceleration command value that is generated by the acceleration-deceleration command section to the command value that is generated by the command value generation section,
the acceleration-deceleration command section is configured to adjust the command value that is generated by the command value generation section so that an average moving speed of a center of gravity of the inverted moving body becomes constant when the determination section makes a determination that travel is performed in the constant direction for the prescribed time or longer, and
the acceleration-deceleration command section is configured to adjust the command value that is generated by the command value generation section and adjust a moving speed of a driving wheel of the inverted moving body to change an inclination of the inverted moving body with swinging movement when the determination section makes a determination that travel is performed in the constant direction for the prescribed time or longer so that a timing when the inverted moving body inclines rearward and can easily be braked is periodically produced.

2. The moving body control device according to claim 1, wherein the acceleration-deceleration command section is configured to increase or decrease a period of the sinusoidal acceleration-deceleration command value according to information of an environment where the inverted moving body moves.

3. The moving body control device according to claim 2, wherein the acceleration-deceleration command section is configured to decrease the period of the sinusoidal acceleration-deceleration command value when a determination that the inverted moving body moves in an indoor environment is made, and to increase the period of the sinusoidal acceleration-deceleration command value when a determination that the inverted moving body moves in an outdoor environment is made.

4. The moving body control device according to claim 1, further comprising a storage section configured to store travel information of the inverted moving body, wherein the acceleration-deceleration command section is configured to increase or decrease a period of the sinusoidal acceleration-deceleration command value according to travel information of the inverted moving body that is stored in the storage section.

5. The moving body control device according to claim 4, wherein the acceleration-deceleration command section is configured to decrease the period of the sinusoidal acceleration-deceleration command value when a fluctuation in the travel information of the inverted moving body is large, and to increase the period of the sinusoidal acceleration-deceleration command value when the fluctuation in the travel information of the inverted moving body is small.

6. The moving body control device according to claim 4, wherein the travel information of the inverted moving body includes at least one of the attitude angle, an attitude angular speed, an attitude angular acceleration, a moving distance, a moving speed, and a moving acceleration of the inverted moving body.

7. The moving body control device according to claim 1, wherein the acceleration-deceleration command section is configured to adjust the command value that is generated by the command value generation section when the determination section makes a determination that forward travel, reverse travel, or a turn is performed in the constant direction for the prescribed time or longer.

8. The moving body control device according to claim 7, further comprising:

a step section on which a rider rides and that is configured to incline in a right-left direction; and a drive section configured to incline the step section in the right-left direction, wherein the acceleration-deceleration command section is configured to adjust the command value that is generated by the command value generation section and controls the drive section to control the inclination of the step section when the determination section makes a determination that the turn is performed in the constant direction for the prescribed time or longer.

9. The moving body control device according to claim 8, wherein the acceleration-deceleration command section is configured to control the drive section to decrease an inclination angle of the step section to an outside of the turn when the generated sinusoidal acceleration-deceleration command value is a negative value, and to control the drive section to increase the inclination angle of the step section to an inside of the turn when the generated sinusoidal acceleration-deceleration command value is a positive value.

10. A moving body control method comprising:

detecting an attitude angle of an inverted moving body;

generating a command value of the inverted moving body according to the detected attitude angle;

controlling drive of the inverted moving body according to the generated command value;

determining whether or not the inverted moving body travels in a constant direction for a prescribed time or longer;

adjusting the generated command value when a determination that travel is performed in the constant direction for the prescribed time or longer is made;

generating a sinusoidal acceleration-deceleration command value;

adding the sinusoidal acceleration-deceleration command value to the command value:

adjusting the command value so that an average moving speed of a center of gravity of the inverted moving body becomes constant when it is determined that travel is performed in the constant direction for the prescribed time or longer; and adjusting the command value that is generated by the command value generation section and adjusting a moving speed of a driving wheel of the inverted moving body to change an inclination of the inverted moving body with swinging movement when the determination section makes a determination that travel is performed in the constant direction for the prescribed time or longer so that a timing when the inverted moving body inclines rearward and can easily be braked is periodically produced.

* * * * *